Patented Feb. 21, 1933

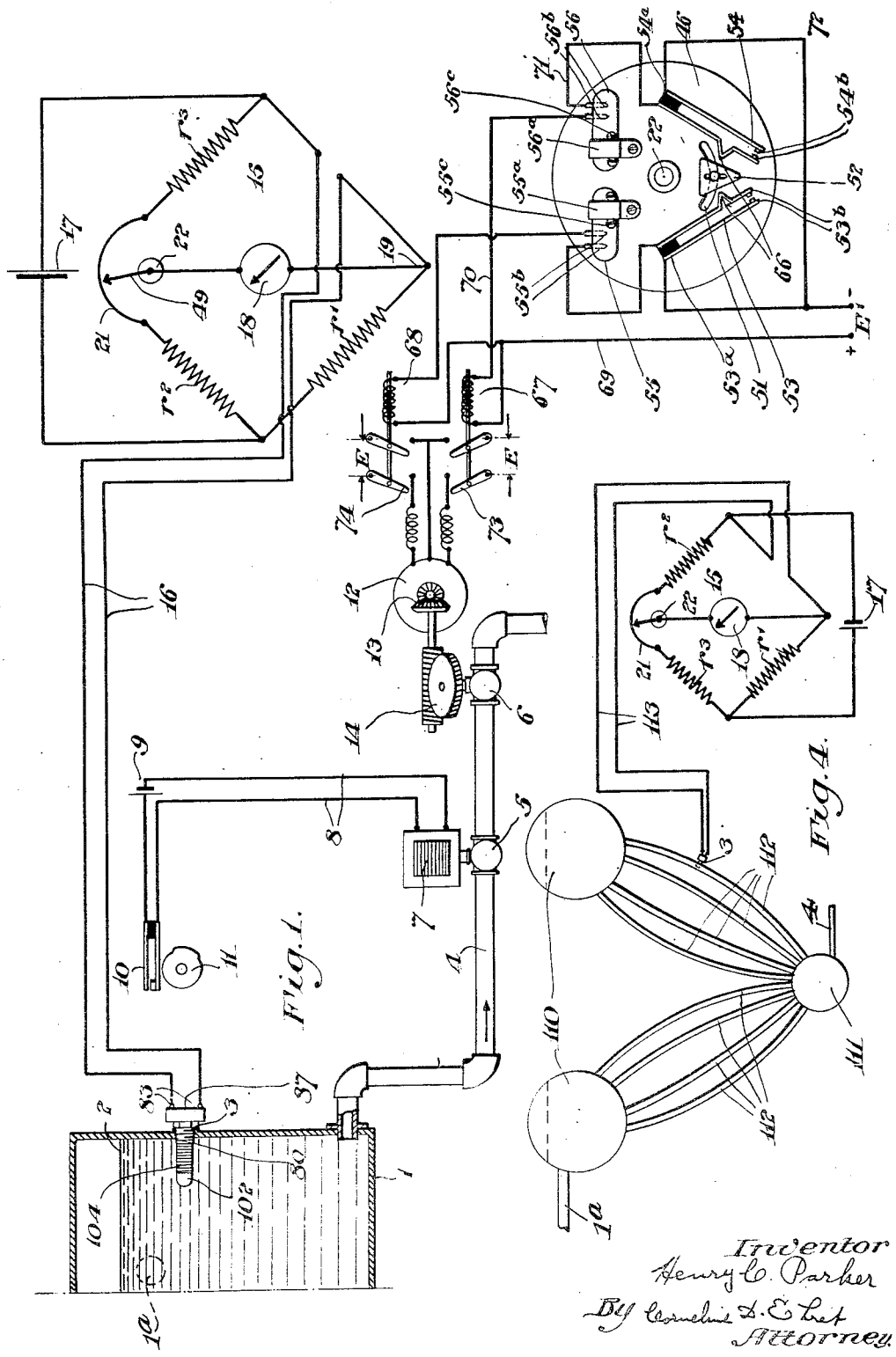

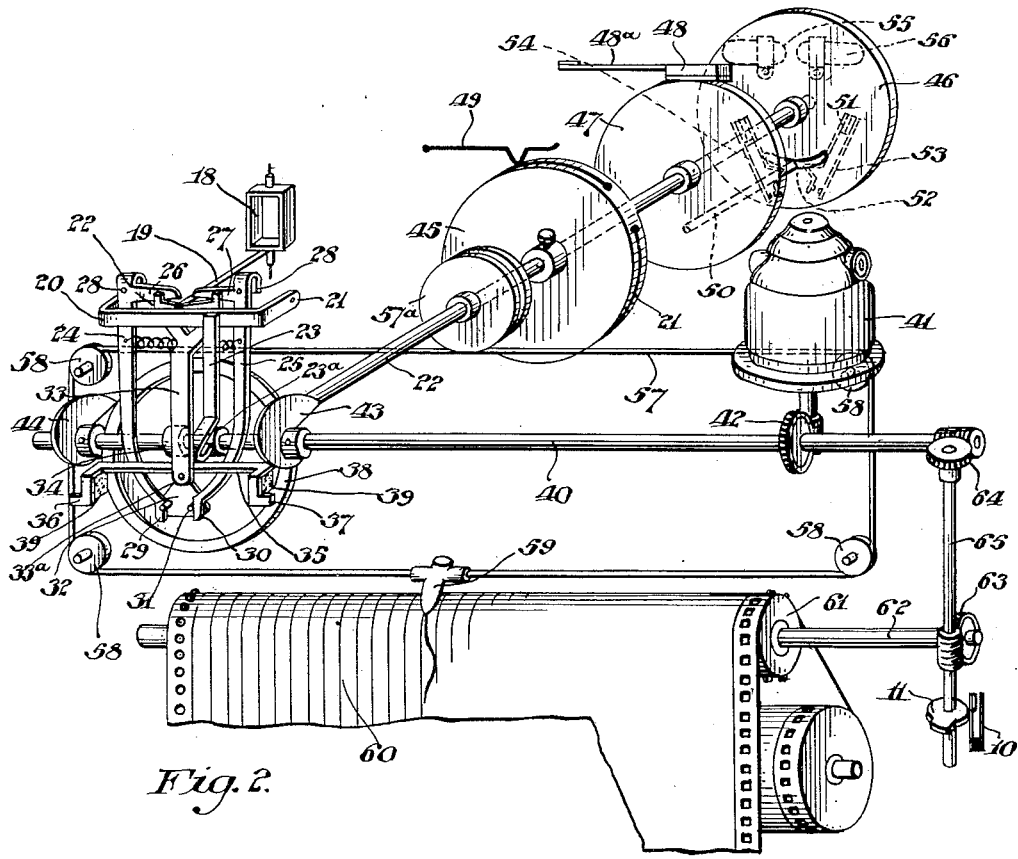

1,898,209

UNITED STATES PATENT OFFICE

HENRY C. PARKER, OF PHILADELPHIA, PENNSYLVANIA, ASSIGNOR TO LEEDS & NORTHRUP COMPANY, OF PHILADELPHIA, PENNSYLVANIA, A CORPORATION OF PENNSYLVANIA

CONTROL SYSTEM AND APPARATUS

Application filed October 19, 1928. Serial No. 313,416.

My invention relates to a control system for maintaining within substantially constant limits the magnitude of a condition, and more particularly a condition affecting the electrical resistance of a fluid.

In the operation of steam generators, for example, as boilers, it has been customary to remove a certain quantity of water periodically, as by "blow-off", from the boiler in order to prevent the concentration and accumulation of soluble and insoluble mineral and organic matter, inorganic salts and other impurities from exceeding a given value and so reducing the efficiency of the heat transfer structure. Since the fresh water feed to the boiler may vary as to its constituents, it will be apparent that the said concentration may vary or build up at different rates, depending also on the rate at which steam is drawn off, and a method of blow-off not taking this possible variation into consideration will only roughly control the degree of concentration. There is a value of concentration below which it would be uneconomical to control, due to the large loss of heat in the blow-off water, and the most economical and efficient operation of the generator will therefore result when the concentration is maintained between such a low limit and a higher predetermined limit.

In accordance with my invention, the blow-off of a steam boiler, or equivalent, is controlled in accordance with the degree of concentration of dissociated matter within the same; further and more specifically, primary blow-off conntrolling means is actuated periodically independently of said concentration, and secondary blow-off controlling means is actuated only in response to variations in the concentration, thereby providing periodic blow-off at varying rates.

Further in accordance with my invention, there is provided control apparatus for anticipating the time lag between the change in rate of the blow-off and the resulting change in concentration of the boiler water.

My invention resides in a method and apparatus of the character hereinafter described and claimed.

For an illustration of one of the forms my invention may take, reference is to be had to the accompanying drawings in which:

Fig. 1 is a diagrammatic view of a control system comprising my invention.

Fig. 2 is a view of apparatus used in the control system shown in Fig. 1.

Fig. 3 is a view, partly in section, of electrode structure.

Fig. 4 shows a specific type of boiler structure with which my invention may be associated.

Referring to Fig. 1, a boiler drum 1 has heat supplied to it by heat transfer structure (not shown) in a well-known manner, and also has means for injecting feed water including inlet pipe 1a for maintaining the water level within the boiler at some predetermined level as at 2. It is a well-known fact that as water in the form of steam is carried away from the boiler drum, the mineral matter is left behind, and more particularly soluble matter as salts, or, more generally, electrolytes gradually increases in concentration until the efficiency of the boiler is reduced. The electrolytes dissociate in the boiler water so that a conducting solution results, the unit resistance of the solution depending upon the degree of dissociation but principally upon the total ion concentration.

For determining this degree of ion concentration, and therefore the concentration of electrolytes within the boiler, electrode structure 3 is mounted in a wall of the boiler drum and extends through the same into contact with the water.

For a brief description of a preferred electrode structure 3 which is more fully described and claimed in my co-pending application Serial No. 394,689, filed September 23, 1929, reference is to be had to Fig. 3. The screw-threaded extension 82 of the supporting member 80, of steel or other conducting material is adapted threadably to engage a hole in the boiler drum. A binding post 83 provides for electrical connection to the boiler drum through the member 80, a conducting rod 86, of corrosion resisting material as nickel, extends through member 80 and terminates in a binding post 87 at one end within a housing 89, having an opening 93 through which connecting wires may be passed. The other end of the rod 86 threadably receives another rod 101, also of nickel or the like terminating in a cap 102, preferably of pure nickel, which is in direct contact with the boiler water at all times. Rod 101 is insulated from the water by a sleeve 104, preferably of thin discs of mica stacked upon each other under pressure and impregnated with a phenol condensation product. Rods 86 and 101 are electrically insulated from the supporting member by the washers 88, sleeve 85, sleeve 96, washer 98, etc.

The electrode structure is highly resistive to the corrosive action of the boiler water and maintains its calibration under the severe conditions of high temperature and pressure. It is also constructed as more completely described in my aforesaid co-pending application to prevent escape of boiler water in the event of mechanical breakdown by the valve action of the member 97.

In Figure 1, a blow-off conduit 4 leading from boiler 1 has valves 5 and 6 disposed in series. Valve 5 is separately controlled by solenoid 7 or other electrically operated valve mechanism, which is energized periodically by a source of power 9 through switch 10 and conductors 8. A constant speed cam member 11 is adapted to periodically close switch 10 for a predetermined length of time, thereby effecting energization of solenoid 7 and opening of valve 5. When solenoid 7 is de-energized, as by opening switch 10, valve 5 moves to fully closed position. Valve 5 will therefore be either fully open or fully closed, depending upon the position of switch 10.

Valve 6 is connected to a motor 12 through suitable speed changing gears 13 and 14 and is adapted to be moved to different positions in a manner hereinafter described.

A Wheatstone bridge 15 having resistances $r1$, $r2$ and $r3$ of predetermined values in three of its branches respectively is connected to terminals 83 and 87 of electrode structure 3 by conductors 16 so that the fourth branch of the Wheatstone bridge comprises the variable resistance of a unit volume of the boiler water between the fixed electrodes 102 and 80. Bridge 15 is energized in any suitable manner, as by an electro-motive force 17 and includes galvanometer 18 connected between terminal 19 and an adjustable contact 49 co-operating with a slide wire adjusting resistance 21. It will be apparent that as the resistance between the electrodes changes due to changes in ion concentration, bridge 15 will be unbalanced, assuming that it was previously balanced, and a new balance may be restored only by adjusting the movable contact 49 along slide wire resistance 21 until galvanometer 18 shows no deflection. The position of adjusting contact 49 with respect to slide wire resistance 21 may therefore be a measure of indication of the ion concentration, hence salt concentration within the boiler.

Apparatus for automatically bringing bridge 15 to a new balance upon variations in the degree of ion concentration in boiler 1 is shown in Fig. 2. Galvanometer 18, which is of the moving coil type, has secured thereto a deflecting member or pointer 19 adapted to actuate a disengageable clutch mechanism in a manner hereinafter described. A U-shaped bracket member 20 pivoted at 21 has secured to its edge a plate member 22 having edges sloping gradually upwardly from its center, and terminating in shoulder portions at either end. Bracket 20 has also mounted thereon arm 23 which co-operates with cam 23a to effect a periodic rocking movement of bracket 20. Arms 24 and 25, having extensions 26 and 27 extending toward each other, are pivoted at 28 independently of bracket 20, and at their lower ends have off-set portions 29 and 30 for engaging pins 31 mounted on plate 32. Plate 32 is pivotally carried on the end of arm 33, which is pivoted at a point not shown, and which is also adapted to be engaged by a cam 34. Plate 32 has mounted thereon a normally transversely extending member 35 having off-set portions 36 and 37. Arm 33 is normally urged toward a disc or clutch member 38, and when in this position member 35 is in frictional engagement therewith through friction blocks 39 carried by the extremities of member 35. Shaft 40, which is driven by constant speed motor 41 through suitable gearing 42 has mounted thereon cams 43 and 44 and the aforesaid cams 23a and 34. Clutch disc 38 is connected to the rotatable shaft 22 upon which are mounted marker actuating disc 57a, slide wire resistance disc 45 and a control disc 46 which will be presently described. An idler disc 47 is loosely carried by shaft 22, being free to rotate thereon within certain limits, and is engaged by a friction element 48 for preventing excessive freedom of movement. Disc 45 has the slide wire resistance 21 mounted on its periphery with which co-operates contact 49. Idler disc 47 has a rod 50 mounted thereon extending substantially perpendicular to the plane of said disc through a curved slot 51 in control disc 46, and at its outer end has mounted thereon a triangular shaped member 52 for co-operation with switches 53 and 54. Mounted also on disc 46 are mercury switches 55 and 56 each having a pair of electrodes or contacts 55b and 56b adapted to be bridged by bodies of mercury 55c and 56c respectively, as best illustrated in Fig. 1.

The operation of the disengageable clutch mechanism is as follows:

Assuming deflection of galvanometer pointer 19 to the right, for example, in response to change in ion concentration, pointer 19, which overlies the edge of plate 22, will move underneath extension 27 of arm 25 and upon upward rocking movement of bracket 20 due to cam 23a, arm 25 will be moved by pointer 19 in a clockwise direction about its pivot 28, and will also tend to rotate plate 32 and member 35 in a clockwise direction about pivot 33a. During the above described movement, cam 34 will also have engaged arm 33 which carries member 35 to move the same away from frictional engagement with clutch disc 38. Arm 25 will therefore be free to rotate member 35 out of its normal horizontal position through an angle dependent on the degree of deflection of pointer 19. Upon return of arm 33 and member 35 to clutch engaging position by resilient means (not shown), off-set portion 36, due to its lifted position is engaged by cam 33, and since now member 35 is in frictional engagement with clutch disc 38, cam 44 will effect counter-clockwise movement of both member 35 and disc 38, thereby returning member 35 to its normal horizontal position.

Rotation of clutch disc 38 in successive steps effects corresponding rotation of shaft 22 as well as discs 57a, 45 and 46. Disc 57a co-operates with a cord or flexible member 57 carried by pulleys 58, and has secured thereto a marker or recording element 59 for tracing a record upon a movable chart 60. Chart 60 is carried on a drum 61 rotatable on shaft 62 through suitable gearing 63 and 64 interposed between the same and shaft 40. A cam element 11 is mounted on the countershaft 65 for co-acting with switch 10. Slide wire resistance 21 mounted upon disc 45 moves relative to fixed contact 49 to effect balance of the bridge.

Referring again to Fig. 1, control disc 46 having mercury switches 55 and 56, and switches 53 and 54 mounted thereon co-acts with member 52 attached to the idler disc 47 for controlling actuation of valve 6.

Switches 53 and 54 comprise resilient conducting arms mounted on insulating blocks 53a and 54a secured to disc 46 and have at their free ends co-acting contacts 53b and 54b. Each switch has an angular portion 66 adapted to engage member 52 and spaced but a close distance therefrom. Switches 55 and 56 are secured to the disc by mounting means, as straps 55a and 56a, which are adjustable so that the switches may be inclined at different angles.

Relays 67 and 68 are adapted to be energized from source E1 through the switches on control disc 46. The circuit through relay 67 is completed through conductor 69 connected to one terminal of source E1, relay 67, conductor 70, mercury switch 56, conductor 71, contacts 54b of switch 54 and conductor 72 to the other terminal of source E1. Relay 68 may be energized in like manner through mercury switch 55 and switch 53. It will be apparent therefore that since switches 55 and 53 and switches 56 and 54 are in series with each other each of a co-acting pair must be closed in order to energize the respective relay. Also deenergization of a relay is accomplished by opening but one of the switches in series therewith.

Relays 67 and 68 control switches 73 and 74 for connecting reversible motor 12 to a source of power E. Relay 67 therefore is adapted to actuate motor 12 in one direction, and relay 68 in the reverse direction, thereby effecting opening and closing movement of valve 6.

The operation of the entire system will now be described. Assuming too high concentration of salts within boiler 1, it will be apparent that the desired concentration may be obtained by blowing down a sufficient quantity of water through conduit 4 so that the concentration within the boiler will be reduced by the addition of fresh feed water to compensate for the amount of blow-off. Valve 5 is fully open at predetermined intervals for permitting blow-off, but the rate of flow therethrough will be regulated by the position of valve 6, which may be in any position between its fully open and closed limits. Blow-off therefore takes place through conduit 4 during a fixed predetermined interval but at variable rates. Due to the assumed high concentration of salts within boiler 1, the resistance between the electrodes 80 and 102 will vary from the normal predetermined value and Wheatstone bridge 15 will be unbalanced, causing deflection of galvanometer 18 and its pointer 19. Upon deflection of pointer 19, shaft 22 is rotated by clutch disc 38 through its disengageable connection with motor 41, in such direction that movement of the slide wire resistance 21 with respect to its co-operating contact tends to restore the balance of the bridge. For purposes of illustration the slide wire resistance in Fig. 1 has been shown fixed instead of movable, it being immaterial which of the members is fixed with respect to the other.

Simultaneous with the balancing operation of the bridge, control disc 46 controls the operation of motor 12. In the present instance, assuming switch 73 effects control of opening movement of valve 6, disc 46 will be rotated by shaft 22 in a clockwise direction which will cause the angular portion 66 of switch 54 to engage member 52, thereby closing contacts 54b and upon continued movement of disc 46 in a clockwise direction the contacts of switch 56 will be bridged by its body of mercury, thereby completing the circuit through relay 67. Upon energization of relay 67 switch 73 is closed and motor 12 effects opening movement of valve 6. Upon subsequent opening of valve 5, the rate of blow-off through conduit 4 will be accordingly increased and the tendency of such rate of increase will be to decrease the degree of concentration within the boiler Control disc 46 will continue to move in a clockwise direction as long as the degree of concentration within the boiler is increasing, but upon attainment of maximum departure from its normal condition, and upon decrease in degree of concentration, control disc 46 will reverse its direction of rotation and will start rotating in a counter-clockwise direction.

As disc 46 reverses its direction of rotation, switch 54 will move away from member 52, thereby permitting contacts 54b to open and de-energize relay 67. Motor 12 will therefore be de-energized and valve 6 will remain in its newly adjusted position until either relay 67 or 68 is again energized.

It will therefore be apparent that valve 6 does not continue its opening movement during the entire time that the concentration with the boiler is above its normal value. In other words, valve 6 is gradually opening only during the period while the concentration is increasing to a maximum departure from its normal value, that is during approximately one-half the time of its departure from normal. By such control it is apparent that "overshooting" of the control is prevented to a large extent as contrasted with previous types of "on-off" control whereby the control means do not anticipate the return of the controlled condition to normal, but instead apply the control during the entire period of departure of the condition from its normal value.

In the same manner when the concentration is too low, bridge 15 is unbalanced to effect rotation of clutch shaft 22 and control disc 46 in counter-clockwise direction to likewise effect closing of switches 53 and 55, thereby energizing relay 68 and closing switch 74. This energizes motor 12 in such direction that valve 6 will continue to slowly close until the concentration starts to increase, thereby causing reversal of disc 46 and opening of contacts 53b of switch 53. Relay 68 is consequently de-energized and switch 74 returns to its normal open position, thereby deenergizing motor 12. It should be borne in mind that idler disc 47, whose periphery is frictionally engaged by a friction shoe 48 mounted upon a resilient member 48a, is moved only by engagement of portion 66 of switches 53 and 54 with member 52 which is mounted on rod 50. Rod 50 has a limited degree of movement within slot 51 of disc 46 thereby permitting member 52 to remain stationary while disc 46 reverses its direction of rotation. During such reversal of rotation, the contacts of one switch are permitted to open as the pressure between said switch and member 52 is relieved, and the opposite switch contacts are closed by its portion 66 as it moves into engagement with member 52. It will be apparent that mercury switches 55 and 56 may be adjusted at different angles on the control disc so that relays 67 and 68 may be energized either a very short or an appreciable time after the concentration has departed from its normal predetermined value. In either case, however, switches 53 and 54 will open upon reversal of rotation of the control disc, such reversal indicating that the concentration is returning towards its normal value.

Cam 11, instead of being driven by motor 41 through interposed gearing, may have independent actuating means for driving the same at any desired speed.

The operation of valve 6 will necessarily be very slow as the variation in degree of concentration of salts takes place at a comparatively slow rate during normal operation of the boiler. The speed at which valve 6 may be most efficiently operated depends upon the time lag of the control with respect to the actual response to the control. In other words, there is a certain time lag or inertia of the control which results in an appreciable delay between the time that valve 6 is moved to a position for effecting a change in the degree of concentration, and the actual change itself. Furthermore by anticipating this time lag or inertia, the concentration may be so controlled that it tends to return to its normal value after control of valve 6 has been discontinued. This type of anticipatory control is fully disclosed and claimed in my co-pending application Serial No. 291,103 filed July 7, 1928 for system of control.

Another use to which my electrode structure may be applied is illustrated in Fig. 4. A boiler of the Sterling type, which comprises drums 110 having a mud or blow-off drum 111 interconnected by boiler tubes 112, has in the present instance, electrode structure 3 disposed in one of the tubes 112 through which the boiler water constantly circulates. Electrode structure 3 is connected by conductors 113 in one arm of a Wheatstone bridge 15 which co-operates with control mechanism of the type previously described to control the blow-off from drum 111 so as to maintain substantially constant concentration of the boiler water.

It will be understood, however, that electrodes may be disposed within a container which has just received a charge of blow-off water from the boiler to co-operate with control circuits and apparatus in the manner previously described. With such an arrangement, more simple electrode structure may be utilized as high pressures are not encountered. Between each blow-off it is essential that the container be substantially emptied so that the electrodes may accurately determine the concentration of the succeeding blow-off water.

It will furthermore be understood that my invention is not limited to the specific application to steam generator systems herein disclosed, but is applicable to any system wherein a solution whose ion concentration is to be controlled has added thereto material, and/or a similar solution, tending to vary the degree of said ion concentration, and wherein said ion concentration may be varied by drawing off a portion of said solution and replacing said portion by a solution having a different degree of ion concentration.

What I claim is:

1. In a steam generating system, a boiler, blow-off structure including a valve for permitting discharge of boiler water at different rates therethrough, and means for controlling the degree of concentration of inorganic salts in the boiler water comprising a second valve in said structure, means for periodically opening said second valve, and means including balanceable electrical measuring network for controlling said first-named valve by and in accordance with variations in said concentration.

2. In a steam generating system, a boiler, blow-off structure including a valve for permitting discharge of boiler water at different rates therethrough, and means for controlling the degree of concentration of inorganic salts in the boiler water comprising a second valve disposed between said boiler and said first-named valve in said structure, means for periodically opening said second valve, and means including balanceable electrical measuring network for controlling said first-named valve by and in accordance with variations in said concentration.

3. In a steam generating system, a boiler, blow-off structure for permitting discharge of boiler water at different rates therethrough, and control means associated with said structure for maintaining the degree of concentration of inorganic salts in the boiler within predetermined limits comprising electrodes in contact with said boiler water for determining the ion concentration thereof, an electrical bridge circuit connected with said electrodes, and apparatus actuated in response to unbalance of the circuit for effecting change in rate of discharge through said blow-off structure.

4. In a steam generating system, a boiler, blow-off structure for permitting discharge of boiler water at different rates therethrough including two valves in series, and control means associated with said structure for maintaining the degree of concentration of inorganic salts in the boiler within predetermined limits comprising means for periodically opening one of said valves, electrodes responsive to variations in concentration disposed in contact with said boiler water, an electrical bridge circuit connected with said electrodes, and apparatus actuated in response to unbalance of the circuit for effecting change in position of said second valve to effect a different rate of discharge through said blow-off structure.

5. In a steam generator system comprising a boiler and blow-off structure associated therewith, the method of maintaining the concentration of soluble impurities in the boiler water within predetermined limits which comprises periodically blowing off boiler water, varying the rate of blow-off upon departure of the concentration from normal in a sense to check the departure and until the concentration begins to return to normal, and then permitting the concentration to return toward normal without further change of the rate of blow-off in said case.

6. In a system comprising a container, a liquid therein having inorganic matter in solution, and means for withdrawing fluid from said container and adding fresh liquid thereto, the method of maintaining within substantially constant limits the degree of concentration of said inorganic matter which comprises periodically discharging some of said liquid, varying the rate of discharge upon departure of the concentration from normal in a sense to check the departure and until the concentration begins to return to normal, and then permitting the concentration to return toward normal without further change in the rate of discharge.

7. In a steam generating system, a boiler, a blow-off valve, motive means for operating said valve, means responsive to variations in concentration of boiler water impurities, and means controlled by said responsive means for effecting actuation of said motive means while said concentration is departing from normal in either sense and ineffective while said concentration is returning to normal.

8. In a steam generating system, a boiler, a valve in the blow off line from said boiler, motive means for operating said valve, means responsive to variations in concentration of boiler water impurities for controlling the energization of said motive means, a second valve in said blow-off line, and means for opening said second valve at predetermined time intervals to permit flow of blow-down water at a rate determined by the setting of the first valve.

9. In a steam generating system, a boiler, a valve, motive means for operating said valve, speed-reducing means interposed between said valve and motor, means continuously responsive to variations in concentration of boiler water impurities for controlling the energization of said motive means, a second valve interposed between said first valve and said boiler, and means for opening said second valve at predetermined time intervals to permit flow of blow-down water at a rate determined by the setting of the first valve.

10. In a steam generating system, a boiler, a valve in the blow-off line thereof, motive means for operating said valve, speed-reducing mechanism between said motor and said valve, means continuously responsive to variations in the concentration of boiler water impurities, and means operated by said responsive means to effect energization of said motor while said concentration is departing from normal to change the setting of said valve in a sense to check the departure and ineffective while said concentration is returning to normal.

11. In combination with a boiler, structure for withdrawing blow-off water from the boiler, means for determining the concentration of impurities in the boiler water, comprising a balanceable electrical measuring network for measuring the resistance of the water in the boiler, said means controlling valve structure to effect discharge of the blow-off water at a rate which is substantially directly proportional to the degree of said concentration.

12. In combination with a boiler, structure for withdrawing blow-off water from the boiler having valve structure therein, means for determining the concentration of impurities in the boiler water, comprising an electrical bridge circuit for measuring the resistance of the water in the boiler, said means controlling said valve structure in such manner as to effect discharge of the blow-off water at a rate which is substantially directly proportional to the degree of said concentration.

13. In combination with a boiler, a valve in the blow-off line from said boiler, electro-motive means for operating said valve, means responsive to variations in concentration of boiler water impurities for controlling the energization of said electro-motive means, a second valve in said blow-off line, a second electro-motive means for operating said second valve, and means for energizing said second electro-motive means at predetermined time intervals to permit flow of blow-down water at a rate determined by the setting of said first valve.

HENRY C. PARKER.